United States Patent
Hanson et al.

(10) Patent No.: US 9,796,095 B1
(45) Date of Patent: Oct. 24, 2017

(54) SYSTEM AND METHOD FOR CONTROLLING INTELLIGENT ANIMATED CHARACTERS

(71) Applicants: David Hanson, Garland, TX (US); Robert Hauser, Frisco, TX (US)

(72) Inventors: David Hanson, Garland, TX (US); Robert Hauser, Frisco, TX (US)

(73) Assignee: Hanson Robokind and Intelligent Bots, LLC, Dallas, TX (US)

( * ) Notice: Subject to any disclaimer, the term of this patent is extended or adjusted under 35 U.S.C. 154(b) by 0 days.

(21) Appl. No.: 13/968,241

(22) Filed: Aug. 15, 2013

Related U.S. Application Data

(60) Provisional application No. 61/683,286, filed on Aug. 15, 2012.

(51) Int. Cl.
- *G06F 19/00* (2011.01)
- *G05B 19/04* (2006.01)
- *B25J 11/00* (2006.01)

(52) U.S. Cl.
CPC ............................... *B25J 11/0015* (2013.01)

(58) Field of Classification Search
USPC .................................................. 700/245–264
See application file for complete search history.

(56) References Cited

U.S. PATENT DOCUMENTS

| | | |
|---|---|---|
| 4,833,624 A | 5/1989 | Kuwahara et al. |
| 6,012,961 A | 1/2000 | Sharpe, III et al. |
| 6,038,493 A | 3/2000 | Tow |
| 6,370,597 B1 | 4/2002 | Eady et al. |
| 6,539,354 B1 * | 3/2003 | Sutton ..................... G10L 21/06 345/423 |
| 6,586,859 B2 | 7/2003 | Kornbluh et al. |
| 7,089,218 B1 | 8/2006 | Visel |
| 7,328,196 B2 | 2/2008 | Peters, II |
| 7,370,022 B2 | 5/2008 | Gupta et al. |
| 7,526,465 B1 | 4/2009 | Forsythe et al. |
| 7,624,076 B2 | 11/2009 | Movellan et al. |
| 7,984,013 B2 | 7/2011 | Lee et al. |
| 2002/0055320 A1 * | 5/2002 | An ........................... A63H 3/48 446/268 |
| 2004/0030448 A1 * | 2/2004 | Solomon ................. F41H 13/00 700/245 |
| 2004/0030449 A1 * | 2/2004 | Solomon ............... B64C 39/024 700/245 |
| 2004/0030570 A1 * | 2/2004 | Solomon ................... F41G 3/04 700/248 |
| 2004/0030571 A1 * | 2/2004 | Solomon .............. G05D 1/0088 700/248 |
| 2004/0068351 A1 * | 4/2004 | Solomon ................. F41H 13/00 701/24 |

(Continued)

*Primary Examiner* — Bhavesh V Amin
(74) *Attorney, Agent, or Firm* — Jack D. Stone, Jr.; Scheef & Stone, L.L.P.

(57) ABSTRACT

A system and method for controlling animated characters. The system involves an animated character mapping perception into a number of domains, including a world domain, linguistic domain and social domain. The system is computationally perceived items that should be abstracted from the character's environment for processing. The animated character is able to utilize different levels of information gathering or learning, different levels of decision making, and different levels of dynamic responses to provide life-like interactions.

7 Claims, 4 Drawing Sheets

(56) References Cited

U.S. PATENT DOCUMENTS

| | | | |
|---|---|---|---|
| 2004/0068415 A1* | 4/2004 | Solomon | G05D 1/0088 89/1.11 |
| 2004/0068416 A1* | 4/2004 | Solomon | F41H 13/00 446/454 |
| 2004/0162638 A1* | 8/2004 | Solomon | G05D 1/0088 700/247 |
| 2007/0128979 A1* | 6/2007 | Shackelford | A63H 3/001 446/484 |
| 2007/0192910 A1* | 8/2007 | Vu | B25J 5/007 700/245 |
| 2007/0217586 A1 | 9/2007 | Marti et al. | |
| 2008/0058988 A1 | 3/2008 | Chung et al. | |
| 2008/0119959 A1 | 5/2008 | Park et al. | |
| 2008/0235165 A1 | 9/2008 | Movellan et al. | |
| 2008/0270097 A1* | 10/2008 | Solomon | A61B 5/416 703/11 |
| 2009/0055019 A1 | 2/2009 | Stiehl et al. | |
| 2009/0187529 A1 | 7/2009 | Regelous et al. | |
| 2010/0299299 A1 | 11/2010 | Kim | |
| 2011/0004577 A1 | 1/2011 | Jung et al. | |
| 2011/0131165 A1 | 6/2011 | Wu | |
| 2011/0144804 A1 | 6/2011 | Song et al. | |
| 2011/0184900 A1 | 7/2011 | Jung et al. | |
| 2012/0083182 A1 | 4/2012 | Heatherly et al. | |
| 2012/0156419 A1 | 6/2012 | Jackson et al. | |

* cited by examiner

SYSTEM AND METHOD FOR CONTROLLING INTELLIGENT ANIMATED CHARACTERS

TECHNICAL FIELD OF INVENTION

This patent application relates to controlling animated characters. More specifically, this patent application relates to controlling anthropomorphic characters and their communication features, including facial expressions, head gestures, body gestures, and the like.

BACKGROUND OF THE INVENTION

Anthropomorphic characters are commonly rendered in various media, including film animation, computer animation and animatronics. These characters are typically electro-mechanical character figures that gesture, but are generally not intelligent in their controls. For instance, known anthropomorphic character are capable of exhibiting facial expressions, such as blinking eyes and moving mouth parts, but are not particularly responsive or intelligent.

An important quality of the human interaction with an anthropomorphic character is the responsiveness of the anthropomorphic character itself. Responsiveness refers to the anthropomorphic character's ability to, for example, make eye contact with a human or respond with appropriate facial and body gestures, depending on the context of the interaction. Appropriate responsiveness is important for improving the emotional response of the humans that interact with the character. For instance, when we view animated characters in feature films or animations, we see characters responding to one another and we sympathize with those characters. Of course, sympathizing with the character increases the viewer's emotional investment in the feature, thereby providing a more memorable viewing experience.

Animated anthropomorphic character toys or figures, such as those deployed in theme parks or themed restaurants, do not exhibit a desired level of intelligence, particularly when these characters are engaged by a human being. Instead, these characters are generally not capable of sensing human presence, and when they do, they are unable to sense human presence with the nuance to be able to make eye contact. Further, these characters are unable to sense or recognize faces or facial expressions, are unable to identify an individual, and are unable to synthesize speech or other human responses in a useful way. In the event a character is able to detect human presence, it is unable to respond in an intelligent manner insomuch as it cannot provide the impression of life that a person would recognize and find meaningful.

As can be easily envisioned, there are substantial computational requirements for providing a sufficiently interactive animated figure. For example, the effective recognition of objects, people, faces and expressions, accurate perception of the environment, generation of convincing speech, and processing of decisions in a conversational model, including natural language processing, are all computationally-intensive processes. The limitations associated with currently available animated characters primarily arise from the computational limitations of those characters. For instance, the micro controllers for consumer-type animated characters are relatively small and therefore incapable of satisfying the computational requirements of perceptual processing, decision processing, and animated output processing as discussed above.

SUMMARY OF THE INVENTION

Embodiments of the present invention provide for the efficient processing of data associated with the animated character's world perceptions using a dynamic decision model. This is accomplished, in part, by abstracting from the center processing screens those processes that require the most processing power. Also, objects are abstracted during the earliest phase of processing and delivered into the space that the agent sees about the world. By way of example, perceived motion gets dropped into the space that the character knows about. Also, a recognized face gets dropped into the space that an animated character can know about. Accordingly, the animated character is not required to process everything in its environment. Objects that are unidentifiable in the current model are abstracted or removed from the perceptual mode. These items are mapped into three-dimensional space in which the agent is aware and are mapped into the natural language terms that they are referred by language.

Embodiments of the present invention involve correlating three-dimensional space models from an animated character's perceptual system with semantic language information. This allows a character to make intelligent decisions about its environment with a very sparse and very fast set of processing instructions.

According to one embodiment, the components for controlling character, e.g., software, hardware, and associated control algorithms, are remotely located from character. For example, such components can be software for controlling character located remote from character, for example, in a PC or in a remote server accessible through a PC.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE DRAWINGS

Figure 1:
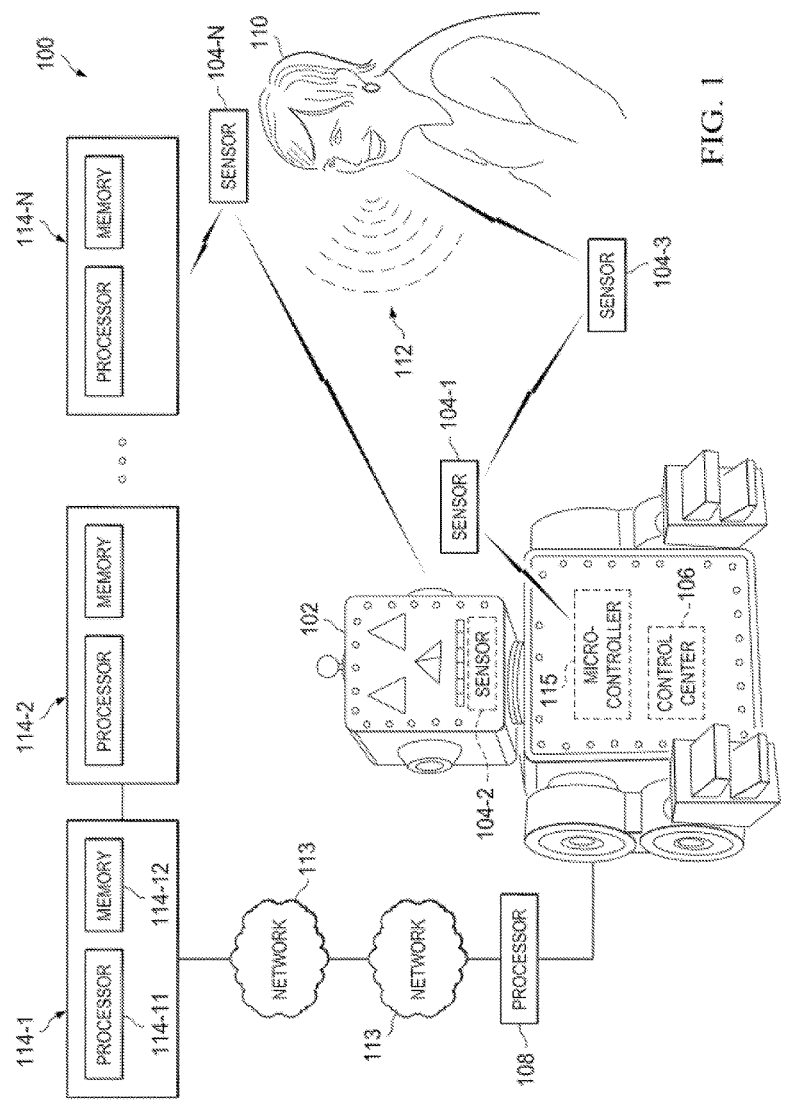
FIG. 1 depicts a system according to an embodiment of the present invention.

Turning now to FIG. 1, system 100 in accordance with one embodiment of the present invention is shown. Animated character 102 represents an example of an animated robot according to embodiments of the present invention. Character 102 may take different forms, such as an electro-mechanical character or a simulated figure on a display screen. In virtual embodiments, character 102 may take the form of a virtual representation on, for example, a display screen. In other embodiments, character 102 may be physically a character that moves within its environment. In the following discussion, character 102 may be referred to as robotic or virtual; however, it should be understood that in the discussion, the term "robot" is not meant to be exclusive. Instead, the description below equally applies to applications where character 102 is virtual or robotic. In the case where character 102 is real or robotic, character 102 would include control mechanisms to effectuate life-like movement. For example, character 102 may include motion control center 106, which may contain a number of actuating components for executing physical motion of character 102. The actuating components of motion control center 106 could be electro-mechanical, hydraulic, or some combination thereof. However, the particular nature of the actuating components is not a limiting factor of embodiment of the present invention. Character 102 will have appropriate animated responses in keeping with the character portrayed by that robot controlled, in part, by the data downloaded to the robot.

Sensors 104-1 to 104-N may be associated with character 102 and also may be dispersed through the environment of character 102. According to the embodiment depicted in FIG. 1, sensors 104-1 to 104-N can be a number of detection devices, including for example, a camera, microphone, passive infrared device, tactile sensor, temperature sensor, or proximity sensor. Sensors 104 serve as input devices to character 102 and/or processor 108, which can process the information received from sensors 104. Depending upon particular embodiments, processor 108 may be remotely located from character 102 and accessible, for example, via one or more networks 113. Processor 108 may be disposed at character 102 such as would occur with a PC, or processor 108 could be on-board robot 102. According to particular embodiments, processor 108 may comprise a network of computers working independently or in a distributed cooperative manner that enables communication among and between characters 102 and can interface with other characters 102 or with a separate computer(s) through a number of interfaces, including wireless interfaces.

Character 102 does not necessarily require any pre-processing of data collected by sensors 104, but may process the sensor data directly. Sensor data collected by sensors 104 may go directly to processor 108, which may be physically associated with character 102, or with an internal processor, e.g., a personal computer placed at a separate location or both. Sensors 104 may be external to character 102, physically disassociated from character 102, or physically connected to character 102. By way of example, where sensors 104 comprise motion functionality, i.e., where sensors 104 comprise an inertial or gravity sensor, accelerometer, or gyro, it may be useful for sensors 104 to be associated with character 102. This allows processor 108 to recognize and process spatial orientation characteristics of character 102 (or its associated robot). Sensors 104 can also comprise GPS functionality, or a digital compass, for sensing the geographic position of character 102. Further, sensors 104 can be sensors that are native to cell phones, e.g., GPS sensors, speech filters and speech recognition chips. In such embodiments, character 102 may be represented as a virtual character on a cell phone screen. Also, sensors can receive a signal that is visible, invisible or electronic. For example, one or more of sensors 104 can be a video imaging camera that sends captured pictures or media data to processor 108 for subsequent action consistent with an application function.

According to one embodiment of the present invention, sensor data received from sensors 104-1 to 104-N is mapped into a number of spaces, or domains, of character 102. This sensor data, whether internal to character 102 or external to character 102, can be used to map a physical three-dimensional space so that character 102 is able to "learn" that physical three-dimensional space. In mapping a three-dimensional space, character 102 compiles sensor data, e.g., photographs, audio data, etc., to construct a virtual three-dimensional space, where qualities such as relative positions of objects within that space are determined. Such processing can be performed onboard character 102, but for the sake of efficiency, these tasks would likely be performed at least partially on one or more external processors, such as processor 108. Once that information is processed, it can then be shared with other animated characters, so that the group of animated characters collectively becomes more intelligent about their environment. By way of example, position and inertial data relating to one or more characters 102 may be ascertained by sensors 104 distributed throughout the environment and shared within a network. Accordingly, the physical location of one or more characters 102 can be determined and future positions predicted based upon initial orientation, velocity, and acceleration data, and the like.

According to the embodiment disclosed in FIG. 1, character 102 is able to keep track of things it perceives as well as things perceived by associated characters. That is, character 102 is able to map its own perceptual inputs received from sensors 104 to a spatial domain and also obtain and map perceptual inputs from other characters. Accordingly, one character 102 is able to receive perceptual information of another character and then clarify, refine and precisely assign position information to objects inside its world domain (as will be more fully discussed with respect to FIG. 2) through multiple perceptions of other characters. Further, in determining its location, each character may rely upon the detection of a given object, specifically designated to denote the location of character. The processing of information also may be performed across a network, where sensor data received from a sensor 104 is outside of the immediate environment of a character. Likewise, a character in one environment can share sensor data with a character in another environment. Accordingly, that perceptual data is shared across environments such that a character is able to navigate a particular discrete environment without having gained firsthand knowledge about that environment beforehand.

The concepts that apply to mapping objects in a spatial domain with respect to physical implementations, as described above, also apply to sensory of objects being mapped within a virtual domain. In the virtual environment, a character is able to sense other characters in the virtual environment and process information relating to, or received from, those characters and then intelligently respond in that virtual environment or within the physical space. It naturally follows that an object having a virtual representation can also have a physical representation, and vice versa. Another way to state this is that in the world domain of a particular character, there may be mappings of real world characters, as well as mappings of virtual characters into that perceptual space.

As discussed above, sensor data of sensors 104 may relate to the physical environment of one or more characters. However, sensor data may also be social data, e.g., data relating to a specific other character that character is going to interact with, e.g., that other character can be a robot, a virtual character or a live person, such as person 110. In such case, sensor 104 may be a camera, such as camera 104-3 that collects and sends information relating to human 110. This information is processed, for example, to extract facial expression information, gestures, body language, or other social information that is used to regulate and intelligently poll character 102 for social engagement (e.g., conversation 112) with human 110. Also, microphone data or audio data may be extracted for speech and/or paralinguistic speech processing. Nonverbal speech queues, such as emotional intonation and other audio data, like noises, are processed so that character 102 can be a more engaging social character. These concepts are important because a character's ability to process and respond to this social data makes the character more life-like.

As discussed above, perceptions are mapped into at least one of the domains of character 102. In world domain 202 (FIG. 2), character 102 is egocentric, that is, world domain 202 focuses on character 102. In world domain 202, each character 102 is placed in a world domain and given an orientation of its own, a processing of its own, and each character perceives objects or other things within world domain 202. So, for example, when another character appears in the world domain of character 102, that character becomes an object perceived by character 102. When character 102 perceives something in world domain 202, e.g., motion, a face, a loud noise, another character, etc., it can be represented in different ways. For instance, a sphere can be used to represent a face or a bi-pedal form could represent another character. Sound can be emitted by an object in world domain 202 and that sound may be emitted from wherever the object is located in the world domain. Character 102 can derive responses based only upon the world domain perception or a combination of perceptions in other domains.

When a character perceives sounds, faces, objects, or touching sensations, each becomes embodied inside a world domain and the character is able to respond to what it perceives. The responses are formulated by the processing of character 102. That is, character 102 has an architecture that is developed so that it can respond in its own way. The processing of character 102 continuously processes what it perceives and generates responses. In certain contexts, certain responses are mapped directly within world domain 202 of character 102.

According to a second aspect of the present invention, a given character 102 has a personality that comprises a set of emotional states and a predefined default emotional makeup. Each character will have a different orientation in its personality with regard to certain emotions. For example, each character can have a tendency towards being happy, towards being sad, towards getting angry, or becoming anxious. These factors are part of the emotional makeup of a character. As a result, a character will not exhibit the same response to the same input every time and different characters will normally respond differently to the same input. The emotional makeup of a character is dynamic within its environment and it determines how that character interacts with people and other characters. A character may become more sad or more happy through these continued interactions.

The current dynamic state of a character's emotions determines what set of content is available to that character for its responses. By way of example, when a character receives an input, that input may match a particular response that would be appropriate if a character is in a "happy" state. But, if that character is not in a happy state, it may not issue what would otherwise be an appropriate response if that character were happy; that is, it may not choose the "happy response" at all, but a different and perhaps "sad response." So, even though a character may have a set of available responses, the response it ultimately chooses will be subject to tremendous variability. Taken further, the variability of a character's response not only depends upon the emotional state of that character, but may also depend upon its perceptual state or the perceptual state of other nearby characters who have mapped their own perceptions into the perceptual space of that character. For example, a first character may map its perception that a particular human is angry into the perceptual space of a second character. As a result, that second character is able to immediately exhibit a more appropriate response when it interacts with the angry human in view of the anger perceived by the first character.

Other dynamic factors within a character's environment can change its emotional state and thereby change the manner in which a character responds. For instance, the character's understanding of a human or other characters can be affected by metadata attached to that human or other characters. Metadata can include data derived linguistically, e.g., a person's spoken favorite color or best friend, or data derived visually, e.g., a person's eye color or if that person walks with a limp. Afterward, the metadata is associated with that particular person or other character and is mapped into the character's own perceptual space, so that when the character is in an environment with that person, the metadata serves as an additional dynamic factor in choosing the types of responses that are appropriate. As described above, the emotional state of character 102 may change in response to a number of occurrences or observances.

Figure 2:
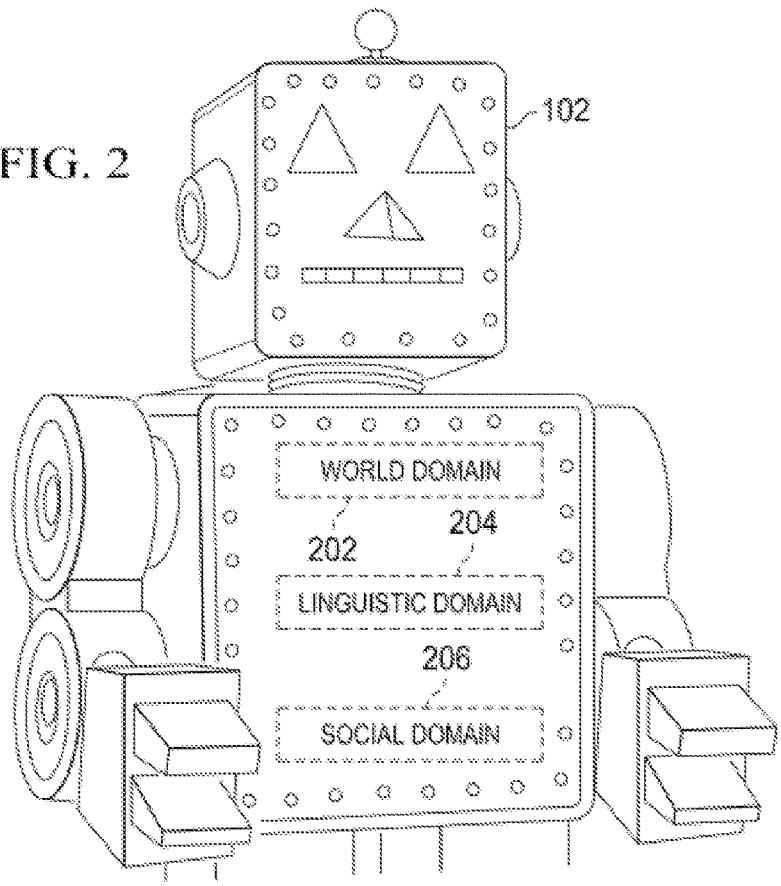
FIG. 2 depicts character domains according to an embodiment of the present invention.

Referring to FIG. 2, each of these occurrences or observances with respect to a character can be mapped into one or more of that character's world domain 202 (which is sometimes referred to as the three-dimensional space), linguistic domain 204, or social domain 206. A character's world domain 202 refers to that domain in which the character's perception of its physical environment is mapped. World domain 202 supports both vision and sound. Linguistic domain 204 refers to that domain in which the language processing performed by character 102 is mapped. The content of various verbal responses available to character 102, each of which having been previously authored, resides in linguistic domain 204. Social domain 206 refers to that domain in which information, such as social relationships, is mapped. Each of these domains ultimately influences the emotional state of character 102. Data in each domain can be loaded into the domain from an external source, such as, for example, a memory device, or data can be obtained by interaction or observation by the character itself, or by another character.

By way of example, suppose a character 102 perceives a loud noise. The loud noise could be mapped into three-dimensional world domain 202. Even though the loud noise is not visible, it is a sound that is supported in world domain 202. Accordingly, the noise is mapped into world domain 202, and because of that event, the perception of character 102 (or perhaps the perception of a nearby character) is mapped into world domain 202. The loud noise could also be loaded into world domain 202 as part of a body of data presented to character 102 from a user. As a result, the anxiety level of character 102 could increase and that increase is shared within linguistic domain 204 as well as with social domain 206. Accordingly, the perceived loud noise, although mapped into world domain 202, may trigger a verbal response that is stored in linguistic domain 204.

Moreover, perceived linguistic content can also initiate a change in the character's emotional state. For instance, character 102 may initiate a conversation by asking human 110 (FIG. 1) to play a game. If human 110 indicates a willingness to play the game, the linguistic response can trigger the state change to increase the happiness of character 102. If the human says no, that response can trigger a different state change of sadness.

Another factor that alters character 102's emotions is peer interaction with other characters. A previously learned emotional state resulting from interaction with another character is persistent. That is, if another character or human consistently prompts a sad emotional state of character 102, that persistence feeling is associated and saved with that person or other character. Later, when the person or other character that triggers the sad response is perceived, character 102 may respond with an appropriate change in emotional state by becoming sadder—without having yet interacted with the human or character.

According to a third aspect of the present invention, the decision making process of character 102 involves several mechanisms. Each character 102 processes various perceptions and memories to determine its response action, which may be expressed through observable behaviors. These response actions may involve speech behavior, gesture behavior, locomotion, or some combination thereof. Other types of response actions may be non-observable. For example, a response action may consist of an internal memory change or addition, change in emotional state, or some other action that is to be performed at a later time.

Figure 3:
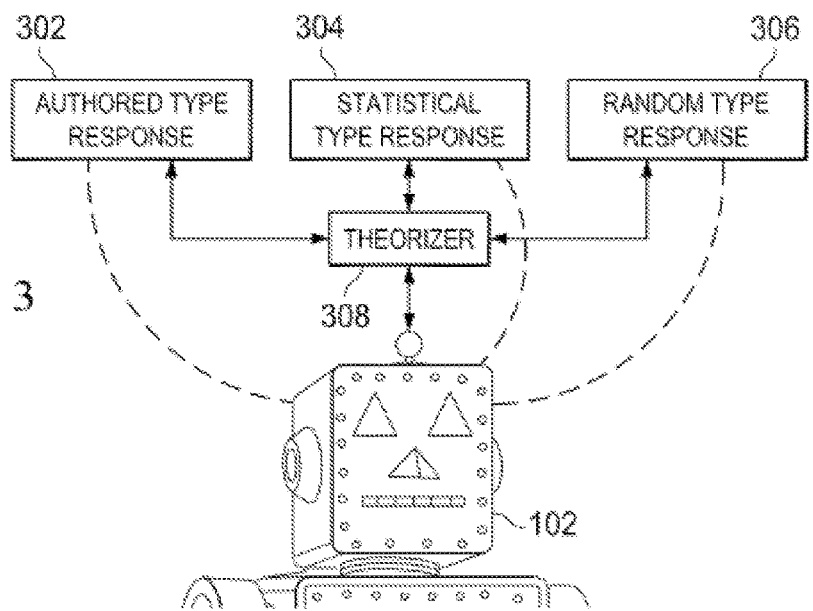
FIG. 3 depicts character response models according to an embodiment of the present invention.

Referring to FIG. 3, there are at least three different models for selecting behaviors or making decisions about what actions a character should take. Most often, these decision making processes can be pre-scripted by an author and stored as part of a character's "personality". As seen at block 302, an author may determine a character's personality, i.e., so that in a given context, the character always responds in a particular manner. Alternatively, at block 304, the decision making process can be determined by an author in a statistical way. For example, character 102 may respond to a particular input a first way seventy percent of the time and may respond to the same input a second way thirty percent of the time. Further, at block 306, character 102 may behave in random fashion some other percentages of time. In such case, it becomes practically impossible to predict, under a given context, how character 102 will behave. This randomness or spontaneity imparts a quality of life to character 102 and makes for more life-like interactions with character 102.

The decision making process takes into account things that are internal to character 102, e.g., perception, memories, emotions, energy level, need for affection and the like. The decision making process is also based upon a hypothesis that character 102 may make. This may include hypothesis in linguistic domain 204, in world domain 202, or social domain 206. For instance, a decision may be implemented in a way where character 102 runs through its own kinematic motions in virtual world domain 202 to see what will happen when character 102 walks off the edge of the table. That is, in the three-dimensional space 202, character 102 is capable of kinematically animating itself before it does so in the real world. In the example above, if character 102 were to determine that a specific action or set of actions would result in its falling off the table, it may decide to stay put. Simply put, character 102 may make a decision based on a hypothesis of results of future actions.

The decision making models discussed above can, for example, be implemented using theorizer 308, which develops theories about the character's physical world, social relationships and behaviors. Theorizer 308 is then able to test its theories in various simulations run within character 102's computation space, or test those theories in the real world. The theories can be revised according to the test results. As discussed above, character 102 may develop a relationship with person 110 by remembering previous interactions with person 110. In doing so, character 102 can model its responsive behavior based upon a theory of person 110. For example, character 102 can theorize as to what person 110 likes or dislikes by extrapolating from its memories of past interactions with person 110. This is an important part of relationship building between character 102 and person 110.

According to a fourth aspect of the present invention, the computational efficiency associated with system 100 is greatly improved. This increase in efficiency is attributable to streamlining the data actually processed by system 100 and appropriately delegating the actual processing of the data. According to the embodiment depicted in FIG. 1, human 110 speaks to character 102 and transmits audio stream 112. Audio stream 112 can, for example, be filtered by a microcontroller, e.g., microcontroller 115. Specifically, audio stream 112 can be filtered for speech-related bandwidth. After audio stream 112 is filtered, the filtered data can be transmitted to an external processor, such as processor 108. Processor 108 can be close to character 102 or remote therefrom, such as at a server or PC connected via network 113. Processor 108 is then able to "listen" for speech within the filtered audio stream and send speech-related data, including emotional content, across network 113 to a bank of servers 114, where more complex computations using various models and representations, including virtual representations of people, objects, relationships, natural language, and natural language processing can be performed. By relegating these complex computations away from character 102, the computations can typically be performed faster and the hardware and software associated with character 102 need not be so sophisticated and that can be implemented in relatively inexpensive fashion.

One efficiency of system 100 relies upon effectively distributing the computational effort at locations that can best handle those complex computations. As such, complex speech processing, e.g., those algorithms necessary for determining the likely emotional state of human 110 based upon received speech data, are preferably carried out at processor 108 or at servers 114. Further, the effective distribution of computational effort allows the most complex computations to be performed offline from character 102. This allows a very efficient runtime application to be downloaded to character 102 with minimal or no interruption in its operation and allows the available content and decision-making capability of character 102 to be dynamically updated.

Efficiency of system 100 is also improved by efficiently indexing the content that is provided to character 102. The content can be efficiently indexed to correlate with, for example, spatial models, physical objects, information objects, social objects, linguistic information, and movements of interest and the like. For example, character 102 can index social objects, e.g., representations of people or a model of a relationship between two people. By way of further example, character 102 may have a nervous tic or may walk with a limp. These movements, once appropriately indexed, can be efficiently retrieved according to the internal state of character 102. The movement that is ultimately retrieved from the index will depend upon, for example, the character's emotional state and/or energy level.

Figure 4:
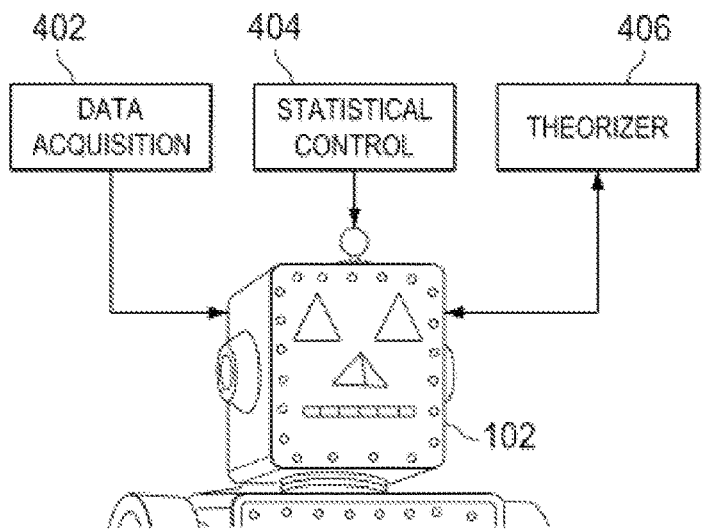
FIG. 4 depicts character decision making modes according to an embodiment of the present invention.

According to a fifth aspect of the present invention, as shown in FIG. 4, systems described herein can utilize different levels of learning so that a character can more effectively build a relationship with a human through thoughtful interaction. The types of learning described below are designed to inter-operate as a system of learning so that the first type of learning, or data acquisition, forms the scaffold for the second or third types of learning. The third type of learning, or theorizer-based learning, is used to modify the rules controlling how character 102 acquires data.

As shown in FIG. 4, learning can occur at character 102 at several levels. First, character 102 can perform data acquisition at step 402, which is predetermined by the programmers and authors regarding what information is required by character 102. As will be described in more detail, the data acquisition level of learning supports other levels of learning, and each level inter-operates with the other to provide for an exceptionally efficient learning scheme. Data acquisition 402 can occur when, for example, character 102 interacts with human 110. Character 102 may introduce itself and ask "what is your name?" Once human 110 answers, character 102 knows the name of human 110. Also, character 102 may recognize a human's face, record images of that face, and then correlate that face with the given name. As a result, when character 102 sees human 110 again, it can call human 110 by name. Of course, this example represents only a very low level of learning.

Character 102 can also utilize statistical learning processes at step 404, which is an approach that is standard in worlds of artificial intelligence and speech processing.

A third level of learning utilized by character 102 is theorizer-based learning at step 406, where character 102 creates representation models across multiple domains. These representations may include spatial representations, semantic representations, statistical representations, and a correlation of these multiple modes of representation. Character 102 is able to test the granular accuracy of the theories and the system-wide accuracy of its theories. For example, once character 102 has identified human 110 through the recognition process, that identification then propagates to the other domains of representation. Based on the checking of the theory, character 102 can check its theorizer 308, as well, and further develop meta-theories. Accordingly, character 102 is able to adapt or update its theories based upon the relative success of its previously-formed theory.

In conjunction with theorizer 308 described above, a character 102 can develop a theory or hypothesis based upon multi-model data sets. For example, character 102 may hypothesize that human 110 is sad based upon the perceived facial expressions of human 110. Once character 102 initiates this hypothesis, it may test its theory by asking human 110 a follow up question, e.g., "are you sad?" In other examples, character 102 may embed the relevant question in another question, so that it comes across as more subtle. For example, character 102 may ask "how is your day going?" Of course the answer to this question may very well answer the unstated theory that human 110 is indeed sad.

A significant feature of theorizer 308 is its simplicity. This simplicity is derived from theorizer 308 by, in one embodiment, employing theory-oriented programming, as opposed to object-oriented programming. This theory-oriented programming is efficient because it comprises theory objects, which include classifiers regarding uncertainty of the theory. As such, character 102 is able to determine what questions need to be validated, and the frequency at which those questions should be revalidated, to accurately test its developed theory. This represents a novel approach insomuch as it provides a learning framework for character 102, not otherwise available with object-oriented programming. The resulting framework includes standing theories of learning with artificial intelligence and machine learning.

A problem associated with conventional machine learning is that it does not contain accurate global representations regarding what it is learning. Using such a model, a machine is unable to "step outside" of a data set that is being checked for accuracy. This is the classic set theory problem—that is, one cannot examine the set as a whole if one is inside that set. The utilization of multi-modal representations or multi-modal models are important for the sophisticated learning required by embodiments described herein. As applied to building social relationships between an animated character and a human, the use of multiple models allows a more efficient determination of, for example, what a person is thinking.

The theory-based programming described herein is designed to allow character 102 to determine the thought process carried out by humans. That is, according to human psychology, humans constantly theorize as to what other people are thinking. As humans, we read and react to facial expressions, examine what another person has said—including emotional intonation and speech. We then compile the information into a cohesive model of what another person might be thinking, and then check that theory through the course of interaction. The kind of learning that allows relationships to be built, and the theory oriented programming as described herein, enables these kinds of relationships to be built between character 102 and human 110.

New content can be created and delivered to character 102 by a number of means. For example, content updates can be executed across a network, perhaps as a result of data being purchased, for example, from a website, or through loading local disks directly onto a character or into a server supporting the character and the like. A software provider may provide updates that expand a character's capabilities, thereby giving the illusion that character 102 has learned from its experiences. Providing new content expands the character's knowledge of the world. In such case, character 102 integrates the provided information with what character 102 has previously learned and expands the character's capabilities and knowledge domain over time. This is another method of learning that does not involve spontaneously acquired knowledge, but instead, presents a systematic method of knowledge acquisition under control if a source is external to the character. In some situations, one character can buy or exchange content with one or more other characters, perhaps via servers 114.

Further, the visual processing screen used to recognize motion and faces and the like is also able to recognize arbitrary objects like chairs, tables and terrain. Accordingly, chairs, tables and terrain can become part of the decision-making classifiers that are delivered to character 102. The knowledge base is updated to include the newly perceived objects. As a result. previous content becomes increasingly detailed with respect to the things in the real world that are available to character 102. Updates are received in terms of details relating to existing content as well as new content. Content, as well as perception activity can grow with the age of the character and while some knowledge may be available all the time, it is not used until a certain age (time passage) is reached or until other knowledge is obtained. According to particular applications, a character may determine the learning of a user it interacts with. For example, character 102 can deliver content in the form of a story and deliver a small comprehension exam at the end of the story. Preferably, this is done by asking entertaining questions so that the user is not obviously aware that he/she is being tested. Depending on the initial test results, a subsequent story can be adjusted to the user's level of comprehension. Accordingly, character 102 is able to adjust to the cognitive capabilities of a particular user, such as a school-aged child, or sight/hearing impairments.

According to a sixth aspect of the present invention, embodiments of the present invention are capable of subtle responses. According to embodiments of the present invention, character 102 is capable of movements, including body gesturing, facial expression, and the like. These responses are derived from processing functions carried out in response to various perceptions. These responses are shared throughout other domains, e.g., linguistic domain 204 and social domain 206.

In essence, world domain 202 reflects a character's vision of the world around it. The world model can be based on the perception of a single character 102 or can be derived from a compilation of perceptions of a number of characters, each sharing their own perceptions with one another, perhaps over network 113. In the most general case, the processing components of each character 102 could be shared components between characters. Thus, world domain 202 could be shared among a number of characters, but each could, for example, have its own source domain or its own theorizer. Thus, while many aspects are shared, the actual actions of each character could be different.

Further, world domain 202 is the domain where responses, including animations, are authored. These animations, such as gestures, movements or spoken responses are executed by the processing component and are highly interruptible. That is, sensor data received from sensors 104 can interrupt and overlay new animations in real time as that sensor data is received by character 102, processor 108 or servers 114. Moreover, the reactions available to a character range in dynamics. That is, some responses such as speech and gestures are highly dynamic while others are not. For example, a character can respond to a loud noise with a startled movement or may respond to a bright light by squinting. Low dynamic responses represent a thin layer of reactive behaviors available to character 102, but are nevertheless part of its architecture.

In certain situations, character 102 may not respond as predicted by the animation. By way of example, when attempting to move forward, character 102 may lose its balance and fall over or may bump into a chair in the room. However, character 102 is informed of these events based upon sensor data received from sensors 104. Accordingly, character 102 is able to very quickly adjust its virtual model to represent that occurrence, even though it is not explicitly animated in the animation stream. In turn, the character's world domain 202 reflects the position of the previously undetected chair or is able to adjust its movement to avoid losing its balance. And by updating the virtual mode in this manner, the character's perception of its orientation within the three-dimensional space becomes more accurate. Also, this allows the character's theory of its own relative position to be tested; that is, its theoretical position is compared to its actual position.

The responses executed by character 102 in world domain 202 can be a result of blending multiple streams of animations together. The responses may represent a compilation of multiple competing streams of animation received from different domains. Also, some responses may take priority over other responses where some responses are expressed immediately and other responses wait to be expressed at a later time. Further, responses or a combination thereof may be executed in varying degrees.

By way of example, character 102 may exhibit a blended response by executing a verbal response while physically moving its lips to synch with the verbal content. In doing so, character 102 chooses appropriate verbal content and speaks using appropriate speech synthesis, while issuing commands in world domain 202 to indicate what lip movements are necessary to synchronize with the spoken response. Also, these lip synching events are sent to world domain 202 and are further blended with a number of other animations, e.g., jumping, rolling around on the ground, etc., so that character 102 is able to execute unscripted, unplanned combinations of behavior. Character 102 can issue different verbal responses independent of its actions or gestures performed during the speech. This blending action occurs on a regular basis.

Other examples of blended responses performed by character 102 include physically moving face "muscles" in conjunction with speech to demonstrate emotion. For example, character 102 may open its mouth to show surprise. However, if character 102 closes its lips to speak, then there must be some method of blending these actions together. Likewise, eye motion should be blended with other responses for expressive use. The eyes may be used expressively to emphasize speech or to give the impression of thought. These blending methods can be hard-coded as rules governing physical behavior of character 102. These rules can be stored and implemented at character 102, at processor 108, at servers 114, or in some combination thereof. In conjunction with the features described herein, these hard-coded rules can be updated in real time or substantially real time to effectuate life-like animation.

To give the impression of life, it is important for character 102 to execute responses as combinations of cognitive emotional states where character 102 expresses its thoughts in a subtle manner. For example, states of contemplation, consideration, or confusion are not emotions per se; however, these are cognitive states capable of being expressed through facial expressions. To effectively portray these cognitive states, it is important to employ speech related emphasis that utilizes head gestures and/or eye gestures. World domain 202 plays an important role when a character needs to execute a blended response as described above.

By way of example, character 102 may need to recall the location of a given person to avoid or initiate eye contact with that person during speech interaction. This recollection is also important in allowing a character to shift its attention to different people during multi-person conversations. The ability of character 102 to execute these functions is enabled by constructing a three-dimensional representation of the environment (including persons contained therein) in combination with motion control system 106, which is used to control its gaze or eye contact from person to person. This subtle behavior is made possible by executing the blended responses described herein and is very important for demonstrating social intelligence that will make a character meaningful.

The idea of using visual and spatial processing to execute non-linguistic visual and/or spatial responses in world domain 202, and to execute linguistic responses, is an important aspect of the present invention. An example of this would be the ability of character 102 to converse with three people, where character 102 speaks to a first person and uses a pronoun and a head gesture to refer to a third person. In speaking to the first person, character 102 may say something like "he [referring to the third person] may think it's a bad idea, but I think it's a good idea." Or character 102 may state "I don't know what he thinks," while gesturing towards that third person but speaking to the first person. As seen, the ability to execute these responses requires that character 102 map the spatial orientation of the three people, recognize the identity of each of the three people, and understand social relationships between the three people. In practice, these responses are made possible as linguistic domain 204 shares information across three-dimensional world domain 202, so that by referring to the three-dimensional model, character 102 can actually make a gesture to the person being referred to. This allows character 102 to head gesture towards the person being referred to without necessitating that such a response be specifically authored by a programmer. In this sense, the response is dynamic insomuch as it is influenced by the state of the environment at the time of the interaction. The response would change according to the positional change of the people. Importantly, the content author is not required to specifically program this response. Instead, the response is based on an automated communication system that uses multiple modes to express semantic content. Likewise, the character automatically generates semantic content and then uses both speech and gestures to communicate that content more efficiently to a person.

A simple example arises in the event where one or more of characters 102 are given a name. A primary character 102 may be named Xeno. The Xeno character has knowledge of a secondary character 102, Chaka. A programmer may author some content such that when Xeno is talking to an arbitrary person, Xeno says "my favorite memory is when I was with Chaka and we went and bought . . . " In this case, Xeno actually has within his perceptual space a conversational character that is identified as Chaka. That is, Chaka is a named entity in the actual three-dimensional world domain 202 of Xeno. This identification may be performed through the vision processing system, or through character 102 communication protocol if Chaka is an actual virtual character. In either event, if Xeno selects the authored content and says, "my favorite memory is when I was with Chaka and we went and bought . . . ", Xeno may be speaking to an arbitrary person, but Xeno knows Chaka's position with respect to Xeno. Accordingly, Xeno can utilize a head gesture or eye movement to indicate he is referring to Chaka, whether or not Chaka is actively present.

Turning now more specifically to linguistic domain 204, audio data processing involves processing some part of the audio data all the way up to the actual form of words. Likewise, audio data is identified according to the dictionary entry of the word, or the best fit or best guessed words. At other times, segments of the audio stream are processed up to phonemes. In such case, a frame specifies words or phrases like "my name is" but processing of the following name is purely phonetic.

Figure 5:
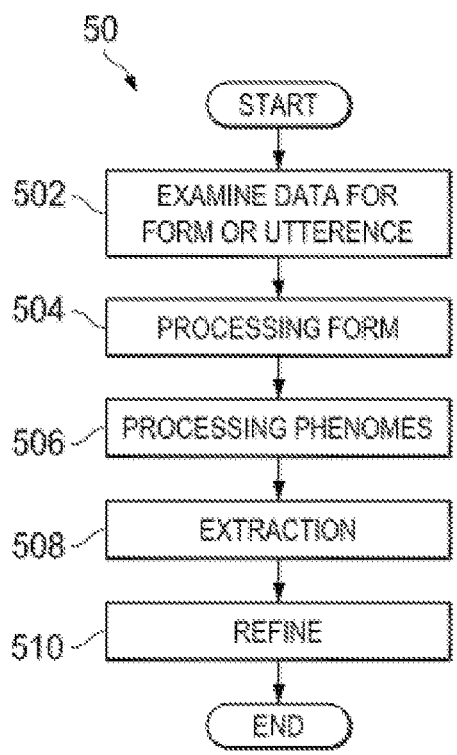
FIG. 5 depicts an audio data processing method according to an embodiment of the present invention.

According to a seventh aspect of the present invention, systems described herein provide for efficient audio data processing and recognition. Referring to FIG. 5, at step 502 the speech recognition system is able to search for a speech utterance, such as "my name is." At step 504, the phrase is located according to the normal means of looking for those words or that full utterance. The given name that follows that phrase is processed in phonemes as shown at step 506. These processing sequences provide character 102 the ability to have open domain speech recognition and closed domain speech recognition. Character 102 may utilize closed domain speech recognition, such as "my name is." The name following the phrase "my name is" is processed to phonemes at step 506 and so if somebody says "my name is Einstein", then character 102 extracts phoneme representations of what the speech recognition system recognizes as "Einstein". This method is an approximation as the phonetics and phonemics vary within the context that they occur in.

At step 508, character 102 may abstract out the phonemes and reproduce them for example, e.g., character 102 may repeat back, "so you said your name is Deinstein?" because character 102 thought it heard "Deinstein." This process involves extrapolation, that is, character 102 is able to determine when the name of an entity in question is about to be given. However, it would be unduly burdensome for character 102 to include a dictionary of all possible names. A solution involves using phonemes and "grabbing" that segment of audio, processing that segment to phonemes, thereby allowing character 102 to actually repeat the name back to the speaker. In any event, the spoken name is approximate in that it is not mapped all the way to the dictionary.

As a last step 510, the last portion of analysis involves refining that set of phonetic representation of the utterance. This relates to learning and refining representation of a person's name by initiating a dialog that includes well-structured frames around that person's name to illicit a response where the name is spoken in a different context. Using the resulting variability or similarity, character 102 is able to refine the phonetics behind the name, and then to come up with "oh, it's not 'Deinstein' its 'Einstein'."

Another learning method of character 102 involves paying attention to social queues, i.e., approval, disapproval or other reaction to a character's behavior. These social queues reinforce the character's theories or discourage theories. Character 102 may also observe the physical behavior of people perceiving gestures or physical actions, creating theories regarding those actions, testing those actions. In the integrated system with a character, with the character architecture, it becomes novel and much more easily applied.

Figure 6:
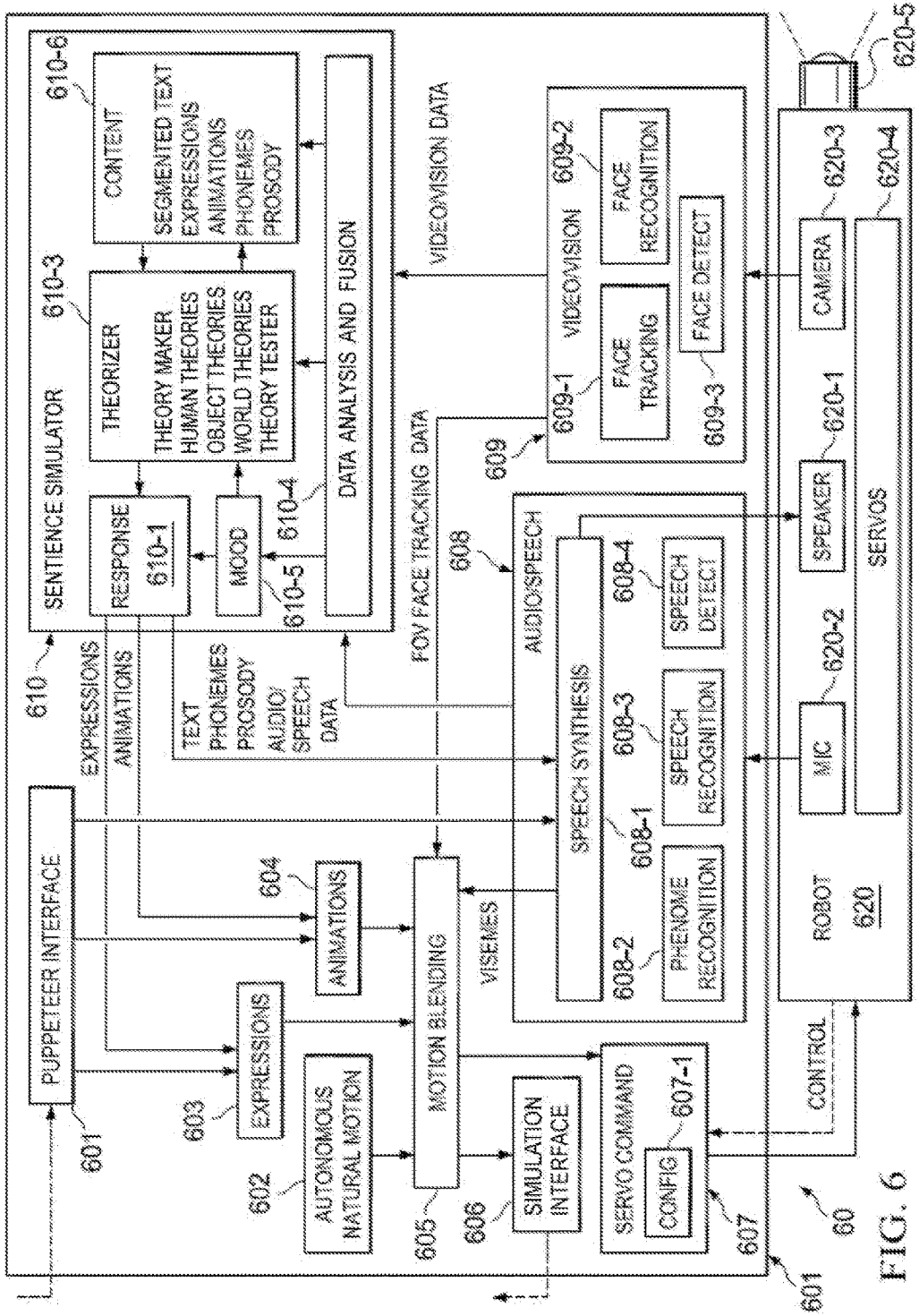
FIG. 6 shows one embodiment of a system for controlling animated characters in accordance with the teaching of the invention.

FIG. 6 shows an example of a character control system that may simulate sentience and life-like behavior using aspects of the invention. In this example, the system optionally may be controlled by a human operator or puppeteer via an interface 601 which optionally may over-ride automated control by the character control software 60. If the character is under automatic or partially automatic control, then algorithms may generate natural-appearing motion commands to achieve autonomous natural motion 602 and expressions 603. Alternatively or in tandem, prerecorded animations 604 may be played on the character. Multiple animation signals may be blended into a coherent output using motion blending 605 algorithms. The resulting output of the animation optionally may be sent to a virtual simulated character via a simulation interface 606, or may be sent to a robot via servo command 607 module, which may generate signals that can control servo motors or servos 620-4 inside a robot 620. The servos 620-4 optionally may be used to affect artificial facial expressions, simulated mouth motions and/or body gestures. The servo command 607 may have a config 607-1 which may adapt animation signals to a particular robot's specific electro-mechanical configuration, so that the software may be easily reusable among robots by adapting only config 607-1 and no other components. The character of the example of FIG. 6 may respond to speech with speech output, by audio/speech 608 processing. When a speech output response is generated, speech synthesis 608-1 may generate natural sounding speech from text, phonemes and/or prosody signals. Once a speech synthesis output 608-1 is generated, it may be output as audio data in a speaker 620-1 and/or output as animations which may include lip-synchronized motions, generated from viseme signals from the speech synthesis 608-1. In a speech interaction with a user, the example of FIG. 6 may use speech recognition 608-3 to approximately determine what a user may be or have been saying, speech detect 608-4 to approximately determine when a speaker is or has been talking, and phoneme recognition 608-2 to approximately determine what sounds the user is or was making, which may help the robot model what a user is meaning. The audio data for these components may be acquired via a mic 620-2 or microphone embedded in the robot. Alternately, the microphone could be outside a robot or even at a distant location. The robot of FIG. 6 may include a camera 620-3 inside the robot, although the camera alternately may be outside the robot 620-5, or both. Said camera may send video signal to video/vision 609 processing. The video signals may be processed for the presence of faces via face detect 609-3 algorithm(s), processed to look for specific faces via face recognition 609-2 algorithm(s), and processed for information regarding the position of faces via face tracking 609-1 algorithm(s). The position of a given face may be considered field-of-view (FOV) face tracking data, which can be used by motion blending 605 to control the servos 620-4 to center on a face, to simulate eye-contact with a user. The presence, position and identity of face(s), along with other video/vision data, and audio/speech data may be sent to a set of processes which may extract knowledge from the data and may decide behaviors for the character to enact, based on the acquired knowledge and data, and this set of processes is herein called a sentience simulator 610. In the sentience simulator, the data may be correlated and fused via data analysis and fusion 610-4 into multi-modal representations which optionally may represent any of various aspects of the world, objects, people, social relationships, 3D spatial information, who said what to whom, maps of the world, to cite a few among many possible representations. The results of this data analysis and fusion may not be perfectly reliable or accurate, and it may be desirable for the robot to manage this uncertainty by creatively speculating about the nature of the world, by generating cohesive and diverse theories about the world, and testing the theories. This is the purpose of theorizer 610-3, which builds numerous, possibly competing theories. In theorizer 610-3, theory maker algorithms use results of data analysis and fusion 610-4, along with other data and existing theories, to generate novel theories about the world of the character. These theories may optionally include, but will not be limited to, human theories, object theories and integrated world theories. These theories may regularly be tested using a theory tester, which may be used as new data is acquired. Using the theory tester, the theories can be evaluated, and re-evaluated, to improve the theories over time. The character's confidence may lower for theories that don't correlate with the data and/or knowledge. The character's confidence may grow for theories that better correlate with the data and/or knowledge. The theories with the lowest confidence values may be discarded, while the theories with the highest confidence values may be used to spawn new theories, so that the theories may iteratively grow more accurate and complex over time. In this way, the character may learn and evolve over time in a way that simulates increasing levels of awareness. The theories may be time-based and may simulate future activity, so may be helpful in predicting the future, and for planning the character's future actions or response 610-1. The theories may involve multiple simultaneous threads of attention, helping to regulate the character's attention. The theories may involve somatic or emotional representations of knowledge, which may be statistical in nature. The present emotional representation may manifest within a mood 610-5 system within the character. The theories and responses may also use pre-programmed expert knowledge and behaviors, or content 610-6, to help as a scaffold for new knowledge, and guide a robot toward character-appropriate behavior. This content 610-6 may include segmented text that may determine what a character says, expressions or animations that may be played in a given context, the phonemes or prosody with which the character articulates speech, for particular expressiveness or emphasis. Altogether, the components of the sentience simulator 610 may inter-operate to affect a character with apparent motives, intentions, the capacity to learn and grow, and creativity.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:
1. A robotic system comprising:
a) robot;
b) a plurality of processors operational for processing data in a manner so as to cause the robot to interact with its environment in a life-like manner, wherein the life-like manner includes facial expressions and at least one of the processors is local to the robot;
c) communication circuitry for allowing the robot and the local processor to bi-directionally communicate with a processor remotely located from the robot such that the environmental interaction is a result of data processed at least in part by the remotely located processor; and
d) a sentience simulator operational for processing data in a manner so as to cause the robot to interact with its environment with at least one of apparent motives, intentions, and creativity, wherein the sentience simulator includes interconnected components comprising:
a response module;
a theorizer including a theory maker, human theories, object theories, world theories, and a theory tester interconnected together;
a data analysis and fusion module;
a mood system; and
a content module, including segmented text, expressions, animations, phonemes, and prosody interconnected together.

2. The system of claim 1 further comprising communication circuitry for allowing the remotely located processor to communicate with at least one robot in addition to the first robot.

3. The system of claim 2 wherein at least a portion of the data that is processed is data shared jointly among a plurality of robots.

4. A system for controlling a plurality of robots; the system comprising:
a) a server in communication with a plurality of robots;
b) processing capability at the server for processing data for delivery to the robots for causing the robots to perform appropriate animation for environmental conditions local to each robot, the animation controlled, in part, by co-processing capability specifically assigned to each of the robots, the co-processing capability independent from server processing capability, wherein the appropriate animation simulates sentience and life-like responses to the environmental data, the sentience including interconnected components that inter-operate to affect the robot with apparent motives, intentions, and creativity, the life-like responses including facial expressions, wherein the interconnected components include:
a response module;
a theorizer;
a data analysis and fusion module;
a mood system; and
a content module; and
c) communication capability for delivering processed data to specific ones of the robots.

5. The system of claim 4 wherein the communication capability is further operable for communicating environmental data from the robots to the server and wherein at least a portion of the data processed by the server for delivery to a specific robot is environmental data communicated to the server from the specific robot.

6. The system of claim 5 wherein each life-like response from a specific robot is based on data unique to the specific robot as processed by the co-processing.

7. The system of claim 6 wherein the specific robot processes data pertaining to a world domain, data pertaining to a linguistic domain and data pertaining to a social domain; and wherein the appropriate animation for a specific robot is based, at least in part, upon the co-processing taking into account data in all of the domains associated with the specific robot.

* * * * *